United States Patent [19]

Brown et al.

[11] 4,222,606
[45] Sep. 16, 1980

[54] TRUCK BODY

[76] Inventors: Raynard C. Brown, 5319 Elm Ave., Long Beach, Calif. 90813; Norval L. Lopshire, 14441 E. 117th St., Artesia, Calif. 90701

[21] Appl. No.: 44,496

[22] Filed: Jun. 1, 1979

[51] Int. Cl.³ .............................................. B62D 33/00
[52] U.S. Cl. ...................................... 296/183; 52/282; 52/397
[58] Field of Search ............... 296/183, 181, 182, 187, 296/188, 189, 191, 193, 203, 29, 30; 52/282, 721, 397, 400; 403/305

[56] References Cited

U.S. PATENT DOCUMENTS

| | | | |
|---|---|---|---|
| 1,859,799 | 5/1932 | Rix | 52/282 |
| 3,034,824 | 5/1962 | Schubach | 296/183 |
| 3,866,381 | 2/1975 | Eschbach | 52/282 |
| 4,065,168 | 12/1977 | Gregg | 296/183 |
| 4,145,080 | 3/1979 | Miller et al. | 296/183 |

Primary Examiner—Robert R. Song
Attorney, Agent, or Firm—Edgar W. Averill, Jr.

[57] ABSTRACT

A truck body made from a number of structurally strong panels. The panels are set in two side rails and a front rail and joined at their vertical intersections by panel joining rails having an inner recess for receiving a flexible adhesive-caulking compound.

6 Claims, 5 Drawing Figures

TRUCK BODY

BACKGROUND OF THE DISCLOSURE

The field of the invention is truck bodies, and the invention relates more specifically to enclosed truck bodies which may either be mounted on the truck frame or on a separate trailor.

Most truck bodies have a welded steel or riveted aluminum structure which supports a relatively thin aluminum siding and top. Often an inner plywood wall or wooden slats are added to protect the thin aluminum surface from damage resulting from sources such as shifting cargo.

Although various attempts have been made to use structurally strong sidewall panels, most such attempts have failed because of numerous practical difficulties. The use of various joining elements typically results in water leakage because of the bowing or bending of the joining elements. This bowing or bending results from the movement of adjacent panels as a result of loading or as a result of the slight movement which results when a loaded truck goes over a bump in the road. Thus, the use of typical joining methods which may be perfectly satisfactory in a stationary building have proved unsatisfactory when tried in trucks. Any joining method, in order to be successful, must permit a certain amount of movement without bowing or springing so that the joint between adjacent panels will remain watertight. Similarly, the method for holding such panels at the bottom must also permit a certain amount of movement and remain watertight. The top joining method is somewhat less critical since water tends to run down and away from the upper joint. The corner joints like the panel joining rails are very critical and must provide a watertight seal in spite of the slight amount of movement that occurs during use.

SUMMARY OF THE INVENTION

The present invention is for a truck body having a plurality of structurally strong panels and having a floor to which two side rails have an upwardly oriented channel having a caulking recess extending at least about half of the height of the channel. The recess is located on the inner surface of the channel along the side of the channel which is on the exterior of the truck body. A plurality of structurally strong rectangular panels are inserted in the channels of the front and side rails. Between each adjacent panel is an upright panel-joining rail which rail has a pair of aligned oppositely faced panel receiving channels. Each channel has one flat side and an opposite side which has a recess containing an adhesive-caulking compound. The recess extends over more than one-half of the opposite side and further extends into the inner surface of the channel. A corner rail is located at the four corners of the truck body, each corner having two channels positioned at 90° from each other and having an inner narrowed web which permits a certain amount of flexibility between the two channels. Each panel has at least one caulking containing recess on an inner face thereof. Two side rails and a front rail are affixed to the top of said panels, these rails having a panel receiving channel at the lower end thereof.

DESCRIPTION OF THE PREFERRED EMBODIMENTS

Figure 1:
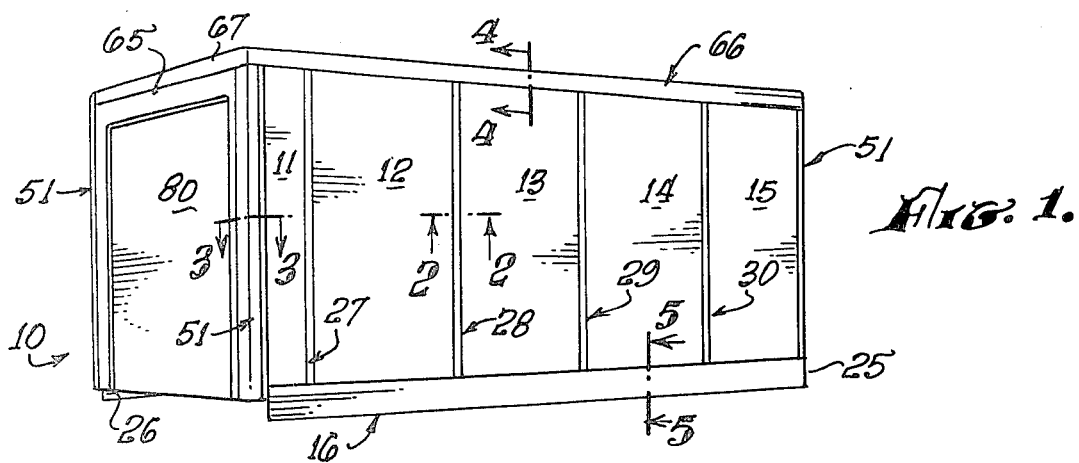
FIG. 1 is a perspective view of the truck body of the present invention.
Figures 3, 4, 5:
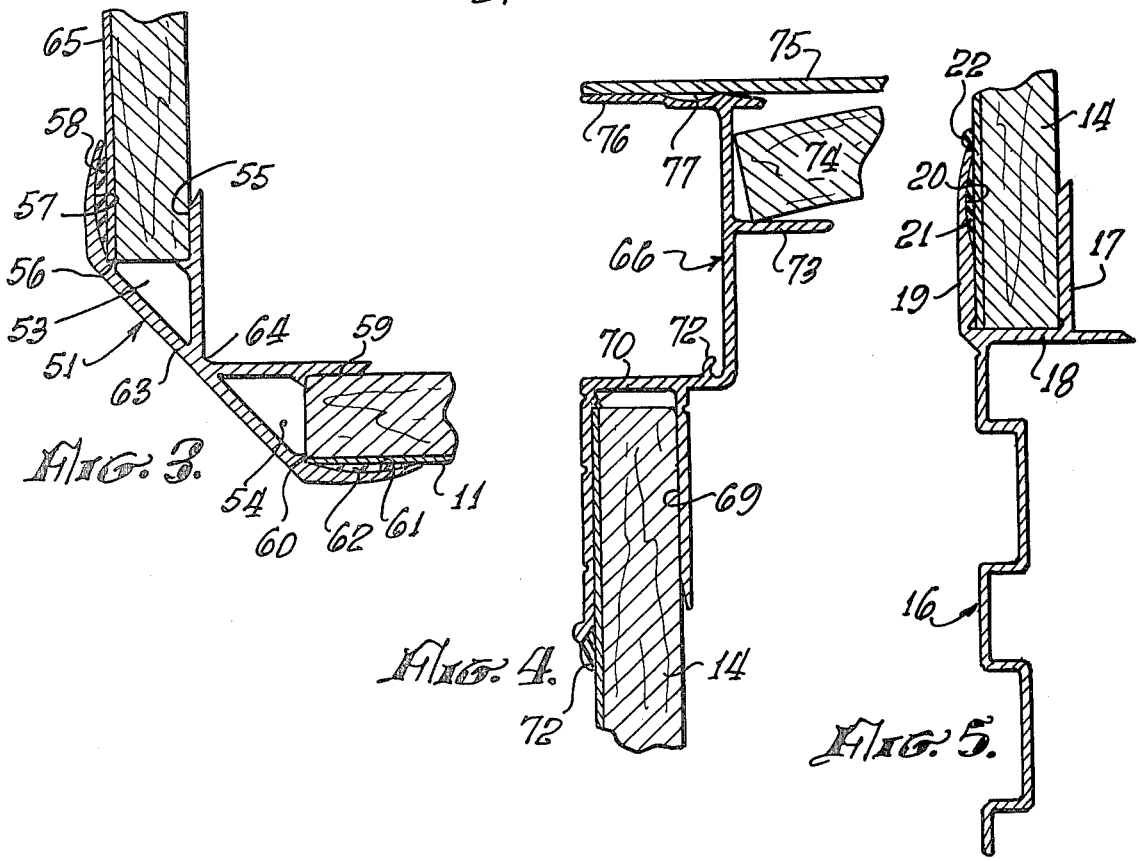
FIG. 3 is an enlarged cross-sectional view taken along line 3—3 of FIG. 1.
FIG. 4 is an enlarged cross-sectional view taken along line 4—4 of FIG. 1.
FIG. 5 is an enlarged cross-sectional view taken along line 5—5 of FIG. 1.

A truck body 10 is shown in perspective view in FIG. 1. The truck body may be mounted on a frame affixed to the truck or on a frame of a trailor which in turn would be affixed to a tractor. The right side of the truck body has five rectangular panels 11 through 15. Panels 11 through 15 are held by bottom rail 16 which is shown more clearly in FIG. 5. As shown in FIG. 5, bottom rail 16 has a channel made up of an inner leg 17, a bottom 18 and an outer leg 19. On the inner surface of outer leg 19 is a curved recess 20 which contains an adhesive-caulking compound 21. Adhesive-caulking compound 21 is preferably a thiokol compound. Preferably, a bead of polymer 22 is placed along the upper joint between the panels and the bottom rail 16. A polymer such as thiokol has been found satisfactory although other flexible weather resistant polymers having good adhesive properties may likewise be used.

Bottom rail 16 as the other rails described herein are made from extruded aluminum, although other materials having similar strength and flexibility may alternatively be used. Corrosion resistance is of course another requirement since the exterior surface of the rails are exposed to the elements.

A front rail 25 and a left side rail 26 are identical in cross-section to rail 16 and hold rectangular panels in the same manner. Rails 16, 25 and 26 are supported by cross bars and a frame in a conventional manner and the bottom such as bottom 18 of each rail rests on the floor of the truck body.

Figure 2:
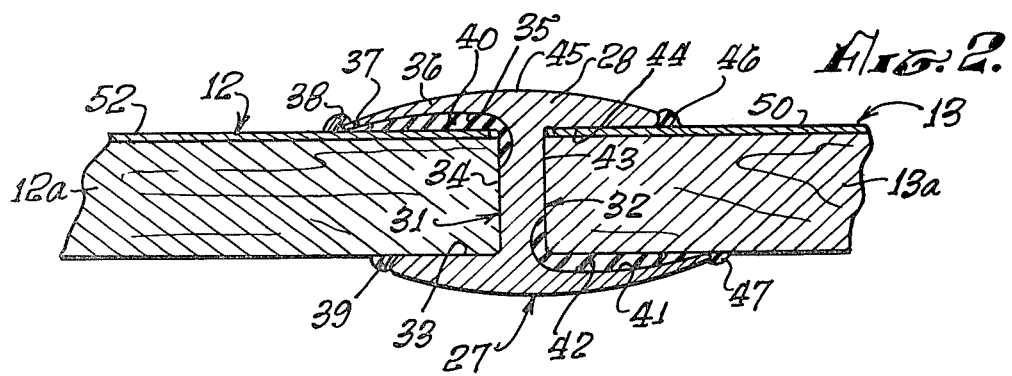
FIG. 2 is an enlarged cross-sectional view taken along line 2—2 of FIG. 1.

Between adjacent panel, an upright panel-joining rail is used to hold the panels together in a weather tight manner. These rails are indicated by reference characters 27, 28, 29 and 30. Rail 28 is shown in an enlarged cross-sectional view in FIG. 2. Rail 28 has two opposingly faced channels 31 and 32 which receive the ends of panels 13 and 12. Channel 31 has a flat inner side 33, and the inner surface of the channel is generally flat except that at one end there is a recess indicated by reference character 35. Recess 35 extends the full length of the curved outer surface 36. The tip 37 of the outer surface 36 is covered with a bead of polymer 38 which is made from the same material as bead 22. This bead is merely an additional source of protection against water leakage. The location of the recess not only along the outer surface 36 but also along a portion of inner surface 34 forms an important part of the present invention. This extension of the recess into inner surface 34 results in a particularly effective sealing mechanism. The recess 35 is filled with an adhesive-caulking compound similar in composition to adhesive-caulking compound 21. This adhesive-caulking compound is elastic and pliable and permits a certain amount of bending between panels 13 and 12 without permanently deforming rail 28. An additional bead of polymer 39 is located on the inner surface of panel 13 which also functions to prevent moisture from entering channel 31.

Similarly, the other channel, 32, has a recess 41 filled with an adhesive-caulking compound 42. Recess 41 likewise extends into a portion of the flat inner surface 43. The third side of channel 32 is flat inner side 44 which is adjacent the outer surface 45 of rail 28. Two beads of polymer 46 and 47 likewise help prevent moisture from entering into the space between the panel and the rail.

The panels of the present invention are preferably plywood panels although other materials of construction could be used. Panels of ¾ inch plywood, 4 feet by 8 feet are readily available and are particularly useful. It is important that the panels be structurally strong since the panels themselves support the roof unlike most prior art truck bodies where the frame supports the roof. The panels of the present invention are covered with a layer of aluminum sheeting which has been laminated to the outer surface. For instance, panel 13 has an aluminum sheet 50 laminated to the outer surface of plywood 13a. Similarly panel 12 has an aluminum sheet 52 laminated to the outer surface of plywood panel 12a. This lamination may be made in a conventional manner as by spraying or otherwise coating the outer surface of the plywood panel with a contact cement and similarly coating the inner surface of the aluminum sheet with contact cement, allowing the two surfaces to dry and then pressing them together under a roller or other device to assure a tight bond. The inner surface of the panels are preferably coated with a conventional coating to prevent moisture absorbtion and warping of the panels.

One advantage of the use of aluminum coated plywood sheets is that the outer side of the truck is very smooth and may be readily lettered or painted and in general has a very neat appearance.

At each corner of the truck body there is an aluminum corner extrusion, three of which are indicated by reference character 51. Corner extrusion 51 is shown in an enlarged cross-sectional view in FIG. 3 and has two channels 53 and 54. Channel 53 has a flat inner surface 55, a panel stop 56 and a curved recess 57 which is filled with an adhesive caulking compound 58. Similarly, channel 54 has a flat inner surface 59, a stop 60 and a curved recess 61 filled with an adhesive-caulking compound 62. The joint 64 between these two channels permits a slight amount of angular movement between panel 11 and end panel 65. This amount of movement, although very slight, helps assure that the seal between the adjacent panels stays intact.

A top rail surrounds the entire truck body. The top rail has a right side 66 and a rear portion 67. As shown in FIG. 4, top rail 66 has a lower channel 68 into which panel 14 fits. Channel 68 has a generally flat inner surface 69, a stop 70 and a generally flat outer surface 71. A bead of polymer 72 helps prevent water from entering channel 68. The top rail also has a recess which contains a channel 72 which may be used to hold the wires for various lights. A shelf 73 supports a roof supporting beam or rafter 74 which in turn supports a sheet of aluminum 75 which forms the roof of the body. Roof 75 is stapled or riveted to the upper ledge 76 of rail 66. Upper ledge 76 has an upper recess 77 which helps convey any water away from the interior of the truck body.

While the upright rail members (such as rail 28) are shown as having the caulking recess on the exterior of the truck body on one side and on the interior on the other side, this is not essential. This orientation is however preferred in that it permits a thinner central wall since the two recesses are not next to each other. Furthermore, while the recesses are shown as curved recesses they could, of course, have generally flat sides and still perform the same function. The rear door 80 is preferably a conventional door having a plurality of horizontaly hinged panels which permits the door to be raised and to curve inwardly and be held under the roof of the body when the door is in an open position.

The present embodiments of this invention are thus to be considered in all respects as illustrative and not restrictive; the scope of the invention being indicated by the appended claims rather than by the foregoing description. All changes which come within the meaning and range of equivalency of the claims therefore are intended to be embraced therein.

What is claimed is:

1. A truck body having a plurality of structurally strong panels, said body comprising:
    a floor;
    two side rails and a front rail, said side rails and front rail having an upwardly oriented channel having a caulking recess extending at least about half of the height of said channel and located on the inner surface of the outer leg of the channel;
    a plurality of structurally strong rectangular panels inserted in the channels of said side rails and said front rail;
    a plurality of upright panel-joining rails between adjacent panels, each of said joining rails having a pair of aligned oppositely faced panel-receiving channels, said channels having one flat side and an opposite side which has a recess containing an adhesive-caulking compound, said recess extending over more than half of said opposite side and said recess further extending into the inner surface of said channels;
    a corner rail at each corner of said truck body, each of said corner rail having two channels positioned at 90° from each other, each channel having at least one adhesive-caulking containing recess in an inner face thereof; and
    two side rails, a front rail and a back rail affixed to the tops of said panels, said rails having a panel receiving channel at the lower end thereof.

2. The truck body of claim 1 wherein said upright panel-joining rails have curved outer faces and curved recesses.

3. The truck body of claim 1 wherein said upright panel-joining rails have a first curved inner recess adjacent the inner surface of one panel and a second curved inner recess adjacent the outer surface of the other panel.

4. The truck of claim 1 wherein said panels are plywood panels.

5. The truck body of claim 1 wherein said panels have a weather resistant skin bonded to the outer surface thereof.

6. The truck body of claim 5 wherein said outer skin is an aluminum sheet.

* * * * *